United States Patent Office 3,547,767
Patented Dec. 15, 1970

3,547,767
FLEXIBLE HEAT AND PRESSURE CONSOLIDATED DECORATIVE LAMINATE COMPRISING A NITRILE RUBBER LATEX IMPREGNATED BASE AND A SUPERIMPOSED TRANSPARENT THERMOPLASTIC FILM
Ronald James Keeling and Alfred Thomas Guertin, Cincinnati, Ohio, assignors to Formica Corporation, Cincinnati, Ohio, a corporation of Delaware
No Drawing. Filed June 27, 1967, Ser. No. 649,130
Int. Cl. D06n 7/06; B32b 15/08, 27/08
U.S. Cl. 161—217                     5 Claims

ABSTRACT OF THE DISCLOSURE

A decorative laminate comprising a heat and pressure consolidated assembly comprising in superimposed relationship at least one dried paper base sheet impregnated with a nitrile rubber latex surfaced with a transparent thermoplastic film back-printed with a design thereby rendering the film translucent.

BACKGROUND OF THE INVENTION

Decorative laminates have been produced for a substantial plurality of years for use as surface materials for the application to tables, vanitories, vertical wall coverings, door coverings and the like. Ordinarily, these decorative laminates are prepared by assembling in superimposed relationship a plurality of kraft paper core sheets which have been impregnated with a thermosetting phenol-formaldehyde resin. Superimposed above these core sheets which may number between 1 and 9 core sheets there is positioned a decorative sheet that is impregnated with a thermosetting resin which does not undergo any noticeable deterioration in color, such as darkening, upon the subsequently applied laminating conditions. Typical resins that meet this description are the melamine-formaldehyde resins, the epoxy resins, the unsaturated polyester resins, the urea resins, and the like. The decorative sheet may be a solid color α-cellulose paper sheet which has been dyed or pigmented to a selected color such as white, pink, yellow, and the like, or the decorative sheet may be a print sheet in which some design such as a geometric design or a floral design or a wood print is imparted to the decorative side of the decorative sheet before or after impregnation with the color stable thermosetting resin. Frequently, there is superimposed above the decorative sheet an overlay sheet which is a sheet of fine quality paper such as α-cellulose paper sheet unpigmented, but impregnated again with a color stable thermosetting resin, which overlay sheet is superimposed above the decorative sheet, and then the entire assembly is heat and pressure consolidated under conventional conditions of pressure and temperature to produce a unitary laminated product. The overlay is used primarily when the decorative sheet is a print sheet so as to provide a barrier to avert abrasion of the printed part of the print sheet and thus preserve its printed characteristics in tact for prolonged periods of time. More recently, a structure such as that described hereinabove has had the overlay replaced with certain selected thermoplastic films produced from vinyl polymers such as films of poly(methyl methacrylate), blends of poly(methyl methacrylate) with polyvinylidene fluoride, polyvinyl fluoride, and the like.

FIELD OF THE INVENTION

The concept of the present invention is in the field of making laminated plastic articles and, more particularly, decorative, flexible, laminated plastic articles which laminated articles provide better solvent resistance, improved impact resistance, better glueability, more body, less telegraphing of substrate defects, greater flexibility, and improved handleability, and when used in combination with an aluminum foil positioned immediately beneath the decorative sheet to provide a surface with improved heat dissipation and, finally, absence of blooming.

DESCRIPTION OF THE PRIOR ART

The known prior art is to be found in the United States Pats. 2,563,111, 2,729,585, 2,759,866 and 3,231,457.

SUMMARY OF THE INVENTION

This invention relates to a decorative laminate which has at least two layers, which layers are arranged in superimposed relationship and then heat and pressure consolidated to a unitary structure. The lower layer of this two-component laminate is sometimes hereinafter referred to as the base member and comprises at least one sheet of paper and, preferably, unbleached creped kraft paper, which has been impregnated with a nitrile rubber latex. Upon completion of the impregnation of the paper web, which can be impregnated continuously, the aqueous portion of the latex or emulsion is then flashed off by passing the impregnated wet web through a heating chamber or oven or it may be passed through a plurality of heated rolls whereby the temperature is sufficient to evaporate the water from the web thereby leaving the nitrile rubber present on and in the dried web. The dried web thus produced is ready to be cut into the desired sizes and positioned in the assembly preparatory to making the laminate. The nitrile rubbers may be acquired from a plurality of commercially available sources and are copolymers of either acrylonitrile and/or methacrylonitrile with a copolymerizable rubber latex forming monomer such as one or more of the butadienes. If desired, one may use a terpolymer of the type of rubber latex which is prepared by interpolymerizing acrylonitrile and/or methacrylonitrile with one or more of the butadienes and one or more of the polymerizable styrenes such as styrene per se or the ring-substituted alkyl styrenes such as o-, m-, p-methyl styrene, and/or the ring-substituted halostyrenes such as the chloro and bromo ring-substituted styrenes and the like. It is preferred to make use of a nitrile rubber latex which is prepared by copolymerizing butadiene and acrylonitrile in a conventional latex or emulsion polymerization technique in which the copolymer contains between about 20 and 50 parts by weight of acrylonitrile and, correspondingly, between 80 and 50 parts of butadiene and, preferably, between about 25 and 35 parts, by weight, of acrylonitrile and, correspondingly, from about 75 to about 65 parts, by weight, of butadiene. As used, the nitrile rubber latex in the aqueous dispersion may contain between about 35% and 55%, by weight, of solids based on the total weight of the latex and, preferably, between about 45% and 50%, by weight, solids same basis. As a further preferred embodiment, one may blend with the nitrile rubber latex up to 75 parts, by weight, of a polyvinyl halide latex such as a polyvinyl chloride latex. These polyvinyl halide latices can be prepared by homopolymerizing a vinyl halide or by copolymerizing it with another compatible and copolymerizable monomer in an emulsion or latex emulsion system. The term vinyl halide is deemed to be of sufficient scope to encompass the vinylidene halides as well which can be used as homopolymers or compolymers with one or more compatible monomers copolymerizable therewith in an emulsion or latex polymerization system. Among the vinyl halides which may be used to form this polyvinyl halide latex are vinyl chloride, vinyl fluoride, vinyl bromide, vinyl iodide, vinylidene chloride, vinylidene fluoride, vinylidene bromide, vinylidene iodide, and the lke. Among the polymerizable monomers which may be used to form copolymers, terpolymers, and the like with the vinyl halide are such polymerizable monomers as vinyl acetate, styrene, the ring-substituted halo and alkyl substituted styrenes, such as o-, m-, p-chloro styrene, o-, m-, p-bromo styrene, and the like, or the 2,4-dichloro styrene, 2,5-dichloro styrene, 3,4-dibromo styrene, and the like. Additionally, one could use the o-, m-, p-methyl styrene, o-, m-, p-ethyl styrene, and the like or the 2,4 - dimethyl styrene, the 2,5-diethyl styrene, and the like. One may use additionally such polymerizable monomers as acrylic acid, methacrylic acid and their esters such as the methyl, ethyl, isopropyl, butyl methacrylates or ethacrylates. It is ordinarily desired that there be used a predetermined amount of the vinyl halide in the copolymer such as about 75 parts of the vinyl halide and, correspondingly, about 25 parts of the corresponding copolymerizable monomers. A particularly useful polyvinyl halide copolymer latex is one prepared by emulsifying 95 parts of vinyl chloride with 5 parts of ethyl acrylate, which copolymer contains no conventional nonpolymeric plasticizers. This vinyl latex may be present in an amount varying between 0% and 75%, whereas the nitrile rubber latex may be present correspondingly in an amount varying between 100% and 25%, by weight, based on the total weight of solids constituents in the latex. It is preferred to use in the blend from about 40% to about 60%, by weight, of the vinyl latex and, correspondingly, from about 60% to about 40%, by weight, of the nitrile rubber latex, same basis as before. It will be apparent that when percentages, by weight, in the blend are given in corresponding terms, it is obvious that the total amount of the separate components are additively 100%. The filler paper used in the base member will be a conventional type of absorbent filler paper, of which a plurality are available commercially such as the unbleached creped kraft paper (Mosinee R–3–B) having an apparent density of 0.327 g./cc. The base paper is treated with the nitrile rubber or resin blend using typical paper saturating techniques to a resin pick-up within the range of from about 45 to about 75%, by weight, based on the total weight of the impregnated dried paper and, preferably, between about 50% and 68%, by weight, of the resin solids based on the total weight of the impregnated dried paper. The base paper thus treated and dried provides a stable, tack-free sheet.

The base sheet is then surfaced with a transparent thermoplastic film back-printed with a design thereby rendering the film translucent. The expression "back-printed" means printed on its back or underside which side will contact the base sheet. The thermoplastic transparent film used as the surface layer may be any transparent colorless thermoplastic film containing no plasticizer or plasticized very lightly with a non-migratory polymeric plasticizer, including such plasticizers as rubbery polymers and copolymers. The essential feature of this thermoplastic film is to impart to the laminate surface a good stain and solvent resistance. Any film containing a plasticizer which impairs this resistance is therefore not acceptable. Additionally, any thermoplastic film which is soluble in common solvents to any significant extent such as alcohols, acetates, carbon tetrachloride, and the like, are unacceptable. The thickness of the surface film is not critical, but economics and commercial availability tend to dictate that the film be selected from those having a thickness between about 0.5 and 6 mils and, preferably, between about 2 and 4 mils. Illustrative of the type of thermoplastic transparent films which may be used for the surface layer of the laminates of the present invention are polyvinyl chloride films, either plasticized lightly or unplasticized films of polyacrylonitrile, films of nylon, films of chlorinated polyethers, films of polyesters, films of polycarbonates, films of poly(methyl methacrylate), films of blends of poly(methyl methacrylate) with polyvinylidene fluoride and films of polyionomers of DuPont Surlyn A, which is a commercially available copolymer of ethylene copolymerized with a monomer containing carboxyl groups to provide an ionically reactive site. One of the preferred vinyl films which may be used to surface the laminate of the present invention is polyvinyl chloride which may be used as a homopolymer or as a copolymer prepared by copolymerizing vinyl chloride with minor amounts such as 15% or less of the acrylates such as methyl acrylate, ethyl acrylate, propyl acrylates, butyl acrylates, methyl methacrylate, ethyl methacrylate, methylethacrylate, ethyl ethacrylate, vinyl acetate, vinyl propionate, and the like. In addition, the polyvinyl chloride homopolymer may be blended with minor amounts such as 15% of a polymeric processing aid such as polymers or copolymers of the acrylates such as methyl acrylate, ethyl acrylate, propyl acrylate, butyl acrylate, methyl methacrylate, ethyl methacrylate, methyl ethacrylate, vinyl acrylate, etc. These surfacing films may contain, if desired, small quantities of plasticizer in an amount of 5% or less such as commerically available epoxy ester metal salts, urethane extended epoxies and other conventional plasticizers such as dibutyl phthalate, dioctyl phthalate, and the like.

In producing the decorative laminates of the present invention, a variety of press cycles may be used such as by varying the pressure between about 200 and 1400 p.s.i. with temperatures between about 135° C. and 260° C. and press times from about five seconds to about 30 minutes. Ordinarily, the time factor diminishes as the temperatures and pressures are increased and vice-versa. If a fully flexible laminate is desired, the core sheets should be eliminated altogether or kept to a minimum such as between about 1 and 4 core sheets as hereinabove defined or sheets similar to the base sheet hereinabove defined. Laminates prepared by increasing the number of core sheets from 1 to 4 all gave satisfactory products but with slightly increased stiffness with the increased number of core sheets. If flexibility of the laminate is less important than rigidity, a plurality of core sheets even in excess of 4 can be used up to about 8 or 9, but beyond that, nothing of significance is to be gained by increasing the total number of core sheets.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

A laminate is prepared by using 2 mil thick transparent rigid unplasticized polyvinyl chloride film back-printed with a wood-grain printed design over a base sheet of 31 lbs. (basis weight) of unbleached, absorbant creped kraft paper treated to a resin level of 50% with a polyblend resin of 55 parts of a polyvinyl chloride latex and 45 parts of an acrylonitrile-butadiene rubber latex (35/65 A:B, respectively), and laminated together at a maximum temperature of 136° C., 1000 p.s.i. for 17 minutes in a veneer pack in a flat bed press. A plurality of these laminates were pressed simultaneously in the press and were separated from one another with suitable release sheets. One of the laminates produced hereinabove was subjected to a plurality of tests and displayed the following properties:

NEMA impact (LD1–2.15) _____ >116″.
Minimum radius (room temp.) __ 0″.
CS abrasion _____ 9200 cycles.
Stains _____ No NEMA stains on short contact.
Peel strength (vinyl base sheet) __ 4.2 lbs./lineal inch.
Thickness _____ .007″.

Example 2

Example 1 is repeated in all essential details except that the base sheet is replaced with an uncreped, unbleached kraft of 43 lb. basis weight. The properties of this laminate are favorably comparable to those produced in Example 1 except that the thickness is increased to 0.009″.

Example 3

The procedure of Example 1 is repeated in all essential details except that the base sheet is replaced with a creped, unbleached kraft paper sheet of 50 lb. basis weight. The properties of this laminate are similar to those of Example 1 except that the thickness is .010″.

Example 4

Example 1 is repeated in all essential details except that the base sheet contains 68% of the resin blend based on the total weight of the dried base sheet and resin. The properties of this laminate are the same as those of Example 1 except that the thickness is .008″.

Example 5

Example 1 is repeated in all essential details except that the filler is treated to a 68% pick-up with a nitrile rubber latex containing 28 parts of acrylonitrile and 72 parts of butadiene. The properties of this laminate are the same as those of Example 1.

Example 6

Example 1 is repeated in all essential details except that the base is treated to a 68% resin pick-up with a 25/75 blend of polyvinyl chloride latex with the same nitrile rubber latex. The properties of this laminate are essentially the same as those described in Example 1.

Example 7

The process of Example 1 is repeated in all essential details except that instead of using a flat press the layers are compressed together into a uniform product using a continuous laminating process by passing the assembly through heated nip rolls. The properties of this laminate are the same as in Example 1.

Example 8

Example 1 is repeated in all essential details except that in the place of the 2 mil polyvinyl chloride film there is substituted a 2 mil transparent film of nylon back-printed with a floral design. A further difference resided in the fact that the laminate was processed in a continuous laminating operation using the apparatus shown in the U.S. Pat. 3,159,526. The final laminate has superior scratch and stain resistance.

Example 9

Example 1 is repeated in all essential details except that the polyvinyl chloride surface film is replaced with a clear nylon film back-printed with a wood grain design and the entire assembly is heat and pressure consolidated into a unitary structure by the process of Example 1. The properties of this laminate are essentially the same as those of Example 1 except for superior scratch and solvent resistance.

Example 10

Example 9 is repeated in all essential details except that the clear nylon film is replaced with a clear film of polyacrylonitrile back-printed with a geometrical design. The properties of the laminate thus produced are favorably comparable of those of Example 1 except for excellent stain resistance.

Example 11

Example 9 is repeated in all essential details except that the nylon film is replaced by a commercially available clear film of a chlorinated polyether of the same thickness backprinted with a wood grain design. The properties are similar to those of the laminate described in Example 1 except for improved stain resistance.

Example 12

Example 9 is repeated in all essential details except that the clear nylon film is replaced by a back-printed clear film of unplasticized polyvinylidene chloride of the same thickness. The properties of this laminate are comparable to those described in Example 1.

Example 13

Example 9 is repeated in all essential details except that the nylon film surface layer is replaced by a commercially available clear film of polycarbonate back-printed with a wood grain design. The properties of the laminate are similar to Example 1 except for reduced stain resistance.

Example 14

Example 9 is repeated in all essential details except that the clear nylon film is replaced by a clear film of a commercially available polyester resin back-printed with a wood grain design. The properties of this laminate are similar to those described in Example 1.

Example 15

Example 1 is repeated in all essential details except that a bondable aluminum foil is positioned between the decorative film and the base layer. The properties of the laminate thus produced are comparable to those of Example 1 except for the greatly enhanced thermal properties, namely, heat and cigarette burn resistance.

Example 16

Example 1 is repeated in all essential details except that three core sheets are incorporated between the decorative film and the base sheet. The core sheets had been preimpregnated with a conventional thermosetting phenol-formaldehyde resin. The properties of the laminate thus produced are favorably comparable to those of Example 1 except for the increased thickness, body and rigidity.

Example 17

Example 1 is repeated in all essential details except that the layers are formed into a uniform product by exerting a pressure of 300 p.s.i. The properties of this laminate are favorably comparable to those of Example 1.

Example 18

Example 9 is repeated in all essential details except that the nylon surface film is replaced by a clear back-printed film comprising a blend of 60 parts of poly(methyl methacrylate) and 40 parts of polyvinylidene fluoride of the same thickness. The properties of this laminate are comparable to those produced in Example 1 except for the improved outdoor weatherability.

Example 19

Example 1 is repeated in all essential details except that under the base sheet there is positioned a rigid wooden board and the lamination is accomplished in one step with the use of a continuous laminating press comparable to that used in Example 8.

Example 20

Example 1 is repeated in all essential details except that the polyvinyl chloride film is replaced by a back-printed clear film of a commercially available homopolymer blend or copolymer of a 80/20 methyl methacrylate/ethylacrylate, respectively, back-printed with a wood grain design.

Example 21

Example 9 is repeated in all essential details except that the clear nylon film is replaced by a clear film of a commercial bondable polyolefin such as polypropylene made bondable by copolymerization with small quantities of acrylic acid (less than 15 parts) which is back-printed with a wood grain or other design. Properties of this laminate are similar to those described in Example 1 except for improved stain resistance.

In the foregoing examples, when reference is made to a clear film which has been back-printed, it should be understood that the film before printing is clear, but that after the back-printing has been accomplished, the film is converted from a transparent state to a translucent one. Although the back-printed film is converted during the back-printing operation from a transparent to a translucent one, it is desired to approach opacity and in order to accomplish this, the translucent back-printed film can be given a "ground coat" optionally, which ground coating is accomplished by applying a layer of a conventional printing ink on the top of the back-print in a thickness varying between about 0.1 mil and 1.0 mil and, preferably, between .3 and .5 mil. This ground coat is applied directly to the printed side of the film and the color of the ink used in the ground coat is generally selected from those which are compatible color-wise with the color of the back-printed film. When a brownish wood grain is used to print the design on the transparent film, a brownish ink may readily be used as the ground coat.

We claim:
1. A flexible heat and pressure consolidated decorative laminate comprising in superimposed relationship at least one dried paper base sheet impregnated with from about 45% to about 75% by weight based on the total weight of the impregnated dried sheet of a nitrile rubber containing from about 25% to 100% of nitrile rubber latex and from 75% to 0% by weight of a polyvinyl halide latex, said base sheet having superimposed thereon a thin transparent thermoplastic surface film, containing not more than about 5% by weight of a plasticizer, back-printed wtih a design thereby rendering the film translucent.

2. The decorative laminate according to claim 1 in which the base sheet is impregnated with a blend of at least 25%, by weight, of said nitrile rubber latex and correspondingly not more than 75% of a polyvinyl halide latex.

3. A decorative laminate according to claim 1 in which the base sheet is impregnated with a blend of about 40–60%, by weight, of said nitrile rubber latex and correspondingly from about 60–40% of a polyvinyl halide latex.

4. A decorative laminate according to claim 1 in which there is positioned between the base sheet and the decorative film between one and 9 core sheets of kraft paper impragnated with a thermosetting phenolic resin.

5. A decorative laminate according to claim 1 in which there is positioned immediately below the decorative film a metal foil.

References Cited

UNITED STATES PATENTS

| 2,306,295 | 12/1942 | Casto | 161—165X |
| 2,311,156 | 2/1943 | Casto | 161—413X |
| 2,563,111 | 8/1951 | Hampson et al. | 161—Wear overlay |
| 2,759,866 | 8/1956 | Seymour | 161—251X |
| 3,097,180 | 7/1963 | Tausch | 260—891X |
| 3,231,457 | 1/1966 | Meissner | 161—413X |
| 3,294,619 | 12/1966 | Noland | 161—6X |
| 3,311,520 | 3/1967 | Michaelson et al. | 161—215X |

JOHN T. GOULKASIAN, Primary Examiner

R. A. KILLWORTH, Assistant Examiner

U.S. Cl. X.R.

161—218, 248, 253, 263, 403, 413; 260—891